(12) United States Patent
Tupinier et al.

(10) Patent No.: US 7,777,620 B2
(45) Date of Patent: Aug. 17, 2010

(54) MOTOR VEHICLE WHEEL ARCH COMPRISING AN ELECTRICAL CIRCUIT AND ASSEMBLY COMPRISING A WHEEL ARCH AND POWER SUPPLY MEANS

(75) Inventors: Mathieu Tupinier, Chamalieres (FR); Christian Jeandey, Saint-Egreve (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 389 days.

(21) Appl. No.: 11/571,224

(22) PCT Filed: Jun. 24, 2005

(86) PCT No.: PCT/EP2005/052959

§ 371 (c)(1),
(2), (4) Date: Jun. 1, 2007

(87) PCT Pub. No.: WO2006/000572

PCT Pub. Date: Jan. 5, 2006

(65) Prior Publication Data

US 2007/0222567 A1    Sep. 27, 2007

(30) Foreign Application Priority Data

Jun. 29, 2004    (FR) .................................. 04 07183

(51) Int. Cl.
*B60Q 23/00*    (2006.01)
(52) U.S. Cl. ...................... 340/447; 340/572.1; 73/146
(58) Field of Classification Search .................. 340/442, 340/443, 444, 445, 447, 449, 572.1, 448; 116/34 A, 34 R; 343/700 MS, 713; 73/146.2, 73/146.5, 146
See application file for complete search history.

(56) References Cited

U.S. PATENT DOCUMENTS

| | | | | |
|---|---|---|---|---|
| 3,810,090 A * | 5/1974 | Davis et al. | ................. | 340/447 |
| 4,582,108 A * | 4/1986 | Markow et al. | ............ | 152/418 |
| 4,760,371 A * | 7/1988 | Don | .......................... | 340/449 |
| 5,883,305 A | 3/1999 | Jo et al. | | |
| 6,538,566 B1 * | 3/2003 | Morand et al. | ............. | 340/444 |
| 6,651,495 B2 * | 11/2003 | Lonsdale et al. | ............. | 73/146 |
| 6,725,712 B1 | 4/2004 | King et al. | | |
| 6,788,192 B2 * | 9/2004 | Shimura | .................... | 340/447 |
| 7,019,711 B2 * | 3/2006 | Johnson et al. | ............ | 343/872 |
| 7,224,318 B2 * | 5/2007 | Mikami et al. | .............. | 343/713 |
| 7,271,710 B2 * | 9/2007 | Saitou et al. | ................ | 340/447 |
| 2003/0098788 A1 | 5/2003 | Tsujita | | |
| 2003/0164758 A1 | 9/2003 | King et al. | | |
| 2003/0179085 A1 | 9/2003 | Ghabra et al. | | |
| 2004/0061601 A1 * | 4/2004 | Freakes et al. | .............. | 340/442 |

FOREIGN PATENT DOCUMENTS

| | | | |
|---|---|---|---|
| DE | 4205911 A1 * | 9/1993 | |
| DE | 19953488 | 5/2001 | |

* cited by examiner

*Primary Examiner*—Van T. Trieu
(74) *Attorney, Agent, or Firm*—Fitzpatrick, Cella, Harper & Scinto

(57) ABSTRACT

A vehicle wheel arch having an electrical circuit for communicating with an electronic component installed in a tire of the vehicle. The wheel arch comprising an electrical circuit embedded within or installed on a surface of the wheel arch. The electrical circuit includes an antenna formed by a substantially flat arrangement of an electrical conductor and configured to communicate at least one of power and data to the electronic component installed in the tire.

18 Claims, 1 Drawing Sheet

MOTOR VEHICLE WHEEL ARCH COMPRISING AN ELECTRICAL CIRCUIT AND ASSEMBLY COMPRISING A WHEEL ARCH AND POWER SUPPLY MEANS

BACKGROUND OF THE INVENTION

1. Field of the Invention

The present invention relates to a motor vehicle wheel arch comprising an electrical circuit and an assembly comprising a wheel arch and power supply means. More precisely, the invention relates to a motor vehicle wheel arch comprising an electrical circuit fully contained within a 3 mm proximity of the wheel arch. A proximity of 3 mm to the wheel arch is used to designate the volume defined by all the points situated at most 3 mm from the wheel arch.

2. Description of Related Art

The tendency is for motor vehicle manufacturers to equip the wheels or tires of vehicles with components having the function of providing information concerning the tires to a vehicle computer. Possible components include, for example, pressure sensors, temperature sensors or tire identification devices.

To this end, each wheel arch of a vehicle is provided with an electrically conductive circuit, designated hereinafter as an "electrical circuit", forming an antenna, connected by electrical cables to the computer and/or to a source of electrical power, while the component is itself also provided with an antenna.

The antenna of the wheel arch is generally molded fully into the wheel arch or adhesively bonded to the surface thereof during manufacture of the wheel arch. During the stage of mounting the wheel arch on the motor vehicle, the antenna is then connected to an electrical power supply of the vehicle by means of electrical connections.

Thus, at the time of incorporation of the antenna into the wheel arch, it is necessary to provide connections to the antenna and leading to the outside of the wheel arch. These connections are often complicated to produce during molding of the wheel arch and are subject to particularly marked fatigue due to the vibrations suffered by the wheel arch during normal use of the vehicle. Furthermore, these connections may cause premature corrosion of the antenna, which is in direct contact with the outside air by means of these connections.

SUMMARY OF THE INVENTION

The object of the invention is to remedy these drawbacks by providing a motor vehicle wheel arch, comprising an electrical circuit fully contained within a 3 mm proximity of the wheel arch, which is particularly simple and robust to manufacture and incorporate into the vehicle.

To this end, the invention provides a motor vehicle wheel arch comprising an electrical circuit fully contained within a 3 mm proximity of the wheel arch, characterised in that the circuit is closed.

The electrical circuit of the wheel arch of the invention is a closed circuit fully contained within a 3 mm proximity of the wheel arch. Consequently, this electrical circuit, which is intended to be used as an antenna, is not electrically connected to an electrical power supply.

Electrical power is supplied to the electrical circuit by magnetic coupling. An electrical coupling circuit, designated hereinafter as "coupling circuit", is used therefor, the coupling circuit being connected electrically to an electrical power supply and being disposed facing the electrical circuit of the wheel arch, so as to ensure the magnetic coupling.

Owing to the invention, the electrical circuit constituting the antenna of the wheel arch is not connected electrically to an electrical power supply and may consequently be simply incorporated into the wheel arch during manufacture thereof. The absence of connections increases the service life of the electrical circuit of the wheel arch by limiting the effects of fatigue or corrosion.

In one particular embodiment, the electrical circuit is fully embedded in the wheel arch composition. In this manner, the electrical circuit is totally protected from external stresses.

Where the electrical circuit is embedded in the wheel arch composition, it is advantageous to provide the radially outer surface of the wheel arch with at least one reference mark designed to reveal the position of the electrical circuit. This reference mark allows precise positioning of the coupling circuit relative to the electrical circuit of the wheel arch. Positioning precision is important because the geometric variation between these two circuits allows impedance matching of the electrical circuit.

The invention makes it possible, during preliminary studies, to specify the relative position of the two electrical circuits and to position the reference mark on the wheel arch for gauging purposes, in such a way as to simplify mounting of the wheel arch and of its power supply during production.

In one particular embodiment, the electrical circuit comprises an electrically conductive wire, designated hereinafter as "electrical wire", forming at least one flat closed loop on a tuning capacitor, preferably two or three loops. By acting on the value of the tuning capacitor, it is possible to fix the radiation frequency of the electrical circuit. For a radiation frequency of the electrical circuit on the order of 13.56 MHz, a 30 pF capacitor may be used.

Since the electrical circuit is designed for use in a particularly harsh environment, it is advantageous for it to comprise a coaxial wire comprising an electrically conductive central conductor, an insulating sheath and an outer shielding sheath interrupted at the level of the tuning capacitor. The shielding makes it possible to provide an antenna which is not very sensitive to environmental effects such as, for example, the presence of water under the wheel arch.

The shielding also makes it possible to minimize the electrical field causing capacitive effects, while maintaining the magnetic field radiation due to the opening in the shielding over several millimeters in the vicinity of the tuning capacitor. In order to increase the effect of the shielding, it is advantageous to ground the outer shielding sheath.

A wheel arch according to the invention may additionally comprise one or more of the following features: the wheel arch may comprise an electrically insulating material; and the electrical circuit may be adhesively bonded to the surface of the wheel arch.

The invention also provides an assembly comprising a wheel arch according to the invention and a power supply means for the electrical circuit of the wheel arch.

An assembly according to the invention may additionally comprise one or more of the following features: power may be supplied to the electrical circuit by magnetic coupling; the power supply means may comprise a coupling circuit disposed facing the electrical circuit of the wheel arch for ensuring magnetic coupling; and the coupling coefficient between the electrical circuit of the wheel arch and the coupling circuit may between 0.4 and 0.6.

BRIEF DESCRIPTION OF THE DRAWINGS

The invention will be better understood on reading the following description, given solely by way of example and made with reference to the appended drawings in which.

DETAILED DESCRIPTION OF THE INVENTION

Figure 1:
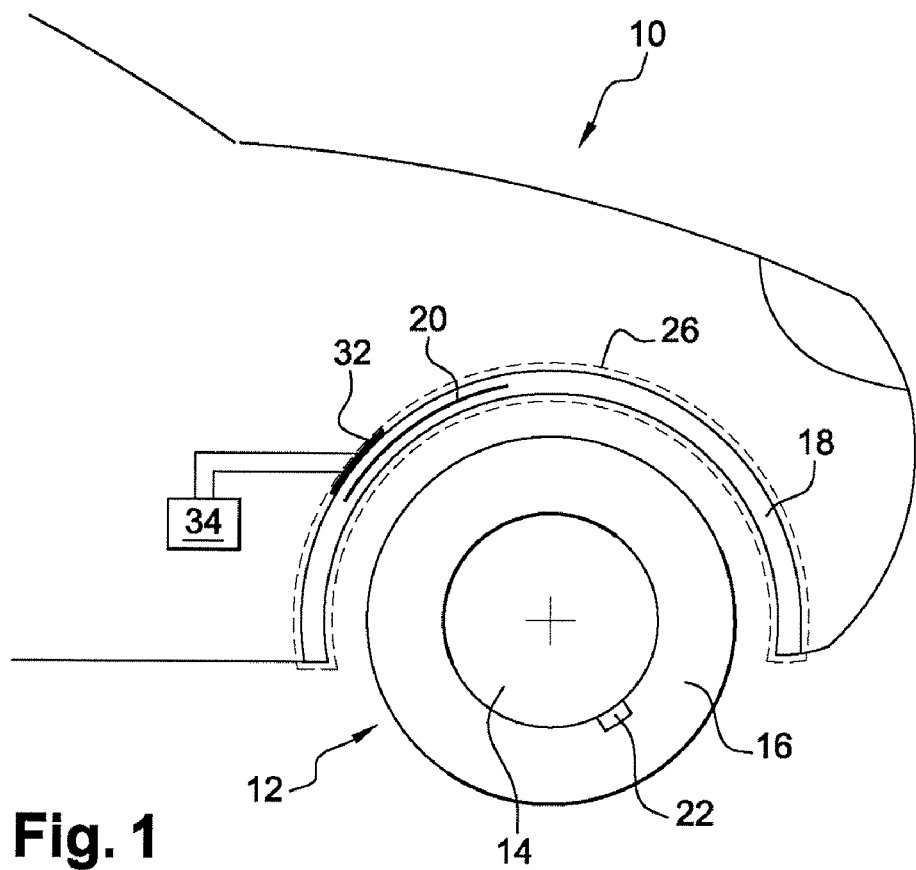
FIG. 1 is a detailed diagram of the front of a vehicle viewed from the side, provided with a wheel arch according to the invention.

FIG. 1 shows the front of a vehicle, designated generally by reference numeral 10. This vehicle 10, which is a car in the example illustrated, comprises mounted assemblies each comprising of a wheel 14 and a tire 16, only the front right-hand mounted assembly 12 being illustrated. The mounted assembly 12 is incorporated into the car 10 under a thin wheel arch 18 obtained conventionally by molding plastics material.

The wheel arch 18 comprises an electrical circuit 20 forming an antenna intended to interact with a component 22 carried by the wheel 14. The component 22 is, e.g., a pressure sensor 22 fixed to the wheel 14 by conventional means. The pressure sensor 22 comprises transmission and/or receiving means intended to allow wireless data exchange with the antenna 20.

Figure 2:
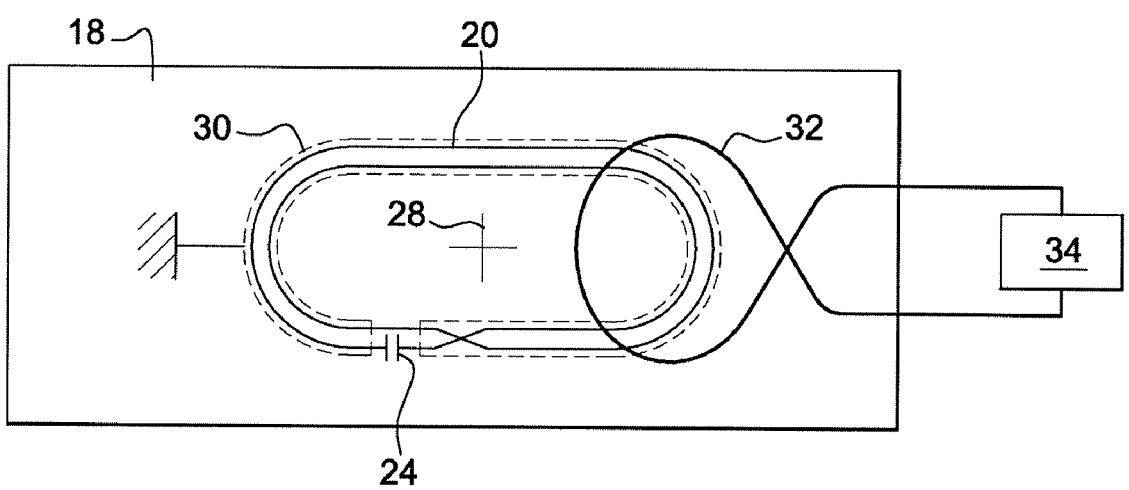
FIG. 2 is a diagram of the wheel arch shown in FIG. 1 viewed from above.

As shown in FIG. 2, the antenna 20 comprises an electrical wire forming two flat loops. The electrical wire forming the antenna is closed by means of a tuning capacitor 24.

Since the antenna is provided to radiate at a frequency of, e.g., 13.56 MHz, its length is 350 mm, its width is 150 mm, and the distance between the loops is 15 mm. The total length of the electrical wire forming the antenna is approximately 2.5 m.

The antenna 20 is flat and is embedded in the composition of the wheel arch 18, such that the antenna is fully contained within a 3 mm proximity of the wheel arch 18. This region of proximity 26 is shown by broken lines in FIG. 1.

To allow the antenna to be located, even when it is invisible because it is embedded in the composition of the wheel arch 18, the wheel arch comprises at least one reference mark 28 visible at the surface thereof and obtained by molding. In the example shown in FIG. 2, the reference mark 28 marks the center of the antenna 20.

In order that only one magnetic field radiates outside the antenna 20, and in order to limit the radiation of the electrical field, the antenna is equipped with a grounded outer shielding sheath 30, illustrated by broken lines in FIG. 2. This outer shielding sheath 30 is interrupted at the location of the tuning capacitor 24 to allow the antenna 20 to radiate a magnetic field.

The antenna 20 is supplied with power by magnetic coupling with a coupling circuit 32 disposed facing the antenna 20 of the wheel arch 18. The coupling circuit 32 comprises a conductive loop connected electrically to power supply means 34 carried by the car 10.

The coupling circuit 32 is positioned precisely relative to the antenna 20 of the wheel arch 18 thanks to the reference mark 28 on the surface of the wheel arch 18.

The geometric variation between the antenna 20 and the coupling circuit 32 allows impedance matching of the antenna 20. Preferably, the magnetic coupling is an inductive coupling whose coupling coefficient is between 0.4 and 0.6.

Use of a coupling circuit offers the advantage of simplicity of control relative to an electrically coupled antenna, because the coupling antenna is floating. Dielectric losses are also eliminated, thereby rendering the antenna less sensitive to external disturbance.

The invention claimed is:

1. A wheel arch of a motor vehicle, comprising an electrical circuit fully contained within a 3 mm proximity of the wheel arch, wherein the electrical circuit is closed and is magnetically coupled to and receives power from a power source on the vehicle, and wherein the electrical circuit is not physically connected to the power source.

2. A wheel arch according to claim 1, wherein the electrical circuit includes an electrical wire forming at least one flat closed loop on a tuning capacitor.

3. A wheel arch according to claim 2, wherein the electrical circuit includes a coaxial wire with an electrically conductive central conductor, an insulating sheath, and an outer shielding sheath interrupted at a tuning capacitor.

4. A wheel arch according to claim 2, wherein the electrical wire of the electrical circuit forms more than one loop.

5. A wheel arch according to claim 3, wherein the outer shielding sheath is grounded.

6. A wheel arch according to claim 1, further comprising an electrically insulating material.

7. A wheel arch according to claim 1, wherein the electrical circuit is embedded in a composition of the wheel arch.

8. A wheel arch according to claim 7, wherein a surface of the wheel arch includes at least one reference mark configure to reveal a position of the electrical circuit embedded in the wheel arch.

9. A wheel arch according to claim 1, wherein the electrical circuit is adhesively bonded to a surface of the wheel arch.

10. A wheel arch according to claim 1, wherein the power source includes a coupling circuit disposed facing the electrical circuit of the wheel arch to ensure magnetic coupling.

11. A wheel arch according to claim 10, wherein the coupling coefficient between the electrical circuit of the wheel arch and the coupling circuit is between 0.4 and 0.6.

12. A system for communicating with an electronic component installed in a tire of a vehicle, the system comprising:
    an electrical circuit embedded within or installed on a surface of a wheel arch of the vehicle, the electrical circuit including an antenna configured to communicate at least one of power and data to the electronic component installed in the tire, the electrical circuit being magnetically coupled to a power source on the vehicle to receive power from the power source, and the electrical circuit being physically disconnected from the power source; and
    a coupling circuit including an antenna and being positioned near the wheel arch, so as to be coupled to the electrical circuit to communicate at least one of power and data to the electrical circuit.

13. The system of claim 12, further wherein the power source is electrically connected to the coupling circuit.

14. The system of claim 12, wherein the antenna of the electrical circuit is formed by a flat, coaxial wire arranged in one or more loops.

15. The system of claim 12, wherein all components of the electrical circuit are passive components.

16. The system of claim 12, wherein the electrical circuit is configured to communicate only via electromagnetic coupling.

17. A vehicle wheel arch comprising an electrical circuit for communicating with an electronic component installed in a tire of a vehicle, the electrical circuit being embedded within or installed on a surface of the wheel arch, the electrical circuit including an antenna formed by a substantially flat arrangement of an electrical conductor and configured to communicate at least one of power and data to the electronic component installed in the tire, the electrical circuit being magnetically coupled to a power source on the vehicle to receive power from the power source, and the electrical circuit being physically separate from the power source, wherein all components of the electrical circuit are passive components.

18. A vehicle wheel arch comprising an electrical circuit for communicating with an electronic component installed in a tire of a vehicle, the electrical circuit being embedded within or installed on a surface of the wheel arch, the electrical circuit including an antenna formed by a substantially flat arrangement of an electrical conductor and configured to communicate at least one of power and data to the electronic component installed in the tire, and the electrical circuit being magnetically coupled to a power source on the vehicle to receive power from the power source, and the electrical circuit being physically separate from the power source, wherein the electrical circuit is configured to communicate only via electromagnetic coupling.

* * * * *